US006232990B1

(12) United States Patent
Poirion

(10) Patent No.: US 6,232,990 B1
(45) Date of Patent: May 15, 2001

(54) SINGLE-CHIP CHIPSET WITH INTEGRATED GRAPHICS CONTROLLER

(75) Inventor: Jean-Luc Poirion, Eybens (FR)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/096,255

(22) Filed: Jun. 11, 1998

(30) Foreign Application Priority Data

Jun. 12, 1997 (EP) ........................ 97410059

(51) Int. Cl.[7] ........................ G06F 15/76

(52) U.S. Cl. ........................ 345/519; 345/520; 345/512; 345/521; 710/129

(58) Field of Search ........................ 345/501, 519, 345/520, 521, 507–509, 512; 710/126–129

(56) References Cited

U.S. PATENT DOCUMENTS 5,335,322 8/1994 Mattison ........................ 345/512
5,659,715 * 8/1997 Wu et al. ........................ 345/512
5,797,028 * 8/1998 Gulick et al. ........................ 712/32

FOREIGN PATENT DOCUMENTS

WO 9515528 6/1995 (WO) ........................ G06F/13/18

OTHER PUBLICATIONS

Bursky, D., "Controller Cuts Cost of PC Workstation Graphics", Electronic Design, vol. 43, No. 13, Jun. 1995.
"Unified Memory Architecture Cuts PC Cost" by Yong Yao, Microprocessor Report, vol. 9, No. 8, pp. 1–5, Jun. 19, 1995.*
RAMBUS–Architectural Overview, pp. 18–23,1993.*

* cited by examiner

*Primary Examiner*—Kee M. Tung

(57) ABSTRACT

A single-chip chipset is provided for a personal computer. A graphics controller is integrated with the chipset and can access system memory. In addition, a frame buffer controller is provided on the same chip to allow the graphics controller to use an optional narrow, high speed, external frame buffer. The single-chip chipset may be used either in a configuration in which the graphics controller shares the system memory, or in a configuration in which the graphics controller uses the optional frame buffer.

15 Claims, 1 Drawing Sheet

SINGLE-CHIP CHIPSET WITH INTEGRATED GRAPHICS CONTROLLER

FIELD OF THE INVENTION

The present invention relates to personal computers, and more specifically to a single-chip chipset with integrated graphics controller.

BACKGROUND OF THE INVENTION

Modern personal computers generally comprise a graphics controller that controls the display of data, and which uses a frame buffer memory. This frame buffer is typically a 1 MB memory linked to the graphics controller through a 32 bit bus. When a 2 MB memory is used, a 64 bit bus is used. Computers also comprise system memory used by the processor for running the operating system and applications. This memory is usually accessed through a 64 bit bus.

UMA or Unified Memory Architecture is an architecture where the frame buffer memory space used by the graphics controller is actually part of the system memory. The advantages of such an architecture are the following. First, UMA permits reduction of the overall amount of memory necessary for a computer. Instead of having 16 MB of system memory and 1 MB of frame buffer, a computer only needs 16 MB shared between the system memory and the frame buffer. Second, UMA allows the graphics controller to use a 64 bit bus, even with only 1 MB of frame buffer.

The drawbacks of UMA are the poor performance, due to memory sharing and memory access collision between the graphics controller and the processor, and the fact that less system memory is available for the operating system.

Taking advantage of the improvement of silicon technology, it has been proposed to integrate the graphics controller into a single-chip chipset. The graphics controller thus has direct access to the processor bus. This provides a wider bus for the graphics controller, even with only 1 MB of frame buffer. FIG. 1 is a schematic view of an embodiment of such a UMA single-chip chipset of the prior art, with its related components. In FIG. 1, the single-chip chipset 1 comprises a peripheral bus controller 3, a memory controller 4, and a graphics controller 5. The chipset 1 is connected to a processor 6 through a processor bus 7, e. g. a 64 bit bus running at 66 MHz. It is also connected to a peripheral bus 8 through the peripheral bus controller 3. The peripheral bus is typically a bus of the PCI type. The chipset 1 is finally connected to the system memory 9, through a system bus 10, e.g. a 64 bit bus at 66 MHz.

As shown by arrows in FIG. 1, the graphics controller 5 has access to the system memory 9, through the memory controller 3 and the system bus 10. Part of the system memory, as explained above, is used as frame buffer. Such a UMA single-chip chipset is sold by . . . under the reference . . .

Such integration of the memory controller on the chipset gives a clear performance advantage, since the graphics controller sits directly on the processor bus. In the case of a 64 bit bus running at 66 to 100 MHz, this provides access to the graphics controller with a bandwidth of 528 to 800 MB; as a comparison a prior art graphics controller bus like the one provided under the tradename AGP allows a bandwidth of 533 MB. However, the chipset/graphics controller of FIG. 1 still presents the drawbacks of UMA, as described above.

There also exists a need today for increasingly higher resolution and colour depth, which requires more frame buffer memory, with a high impact on performance. The UMA architecture of FIG. 1 may provide such features if the size of the system memory is increased, but still presents the same drawbacks.

The object of the invention is to provide an architecture for personal computers, that overcomes the above described drawbacks of UMA, while providing high resolution, colour depth and performance.

Another object of the invention is to provide an easily upgradable architecture, that may easily be adapted to different types of configurations.

SUMMARY OF THE INVENTION

According to the invention, there is provided a single-chip chipset with integrated graphics controller, said chipset including:

- a graphics controller;
- first external-interface means for connecting to external system memory;
- a memory controller connected to said first external-interface means and including means for interfacing the memory controller and graphics controller to allow the latter to access said system memory through said first externalinterface means;
- second external-interface means for connecting to an external frame buffer memory;
- a frame-buffer controller connected to said second external-interface means and including means for interfacing the frame-buffer controller and graphics controller to allow the latter to access said external frame buffer through said second external-interface means; and
- control means for controlling the operative interconnection of the graphics controller with at least the external frame buffer memory through the framebuffer controller.

With this arrangement, the frame buffer may be provided either as part of the system memory or by a separate external memory, as appropriate.

Providing sufficient connectivity on a single chip for two external memories presents its own difficulties. Prefereably, therefore, the frame buffer controller and second external-interface means are designed to provide a high-speed narrow access path to the external frame buffer, thereby minimising the pin count associated with this path whilst giving good performance.

The control means can simply control the connection of the graphics control in response to an external input. Preferably, however, the control means includes detection means for detecting whether an external frame buffer is connected to the second external-interface means. In this case, in one embodiment the control means is responsive to the detection means indicating the presence of an external frame buffer memory, to permit access between the graphics controller and the frame-buffer memory, and otherwise to inhibit such access; access from the graphics controller to the system memory being permitted independently of the whether the frame buffer memory is present. In another embodiment where the control means also controls access of the graphics controller to the system memory through the memory controller, the control means is responsive to the detection means to permit access between the graphics controller and one only of the system memory and frame buffer memory, the control means being responsive to the detection means indicating the presence of an external frame buffer memory, to permit access between the graphics controller and the frame-buffer memory, and otherwise to permit access between the graphics controller and system memory.

The invention further provides a computer having such a single-chip chipset with integrated graphics controller. The computer will be provided with means for receiving a frame buffer memory and means interconnecting said means for receiving to said second external-interface means of the single-chip chipset. The computer can be initially used without a frame buffer being present and later upgraded.

The invention further provides a process for allocating memory to a graphics controller integrated into a single-chip chipset, the process comprising the steps of:

allowing access of the graphics controller to the system memory, through the memory controller, and allowing access of the graphics controller to the frame buffer through the frame buffer controller when a frame buffer is connected to the second means.

BRIEF DESCRIPTION OF THE DRAWINGS

A single-chip chipset/graphics controller embodying the invention will now be described, by way of non-limiting example, with reference to the accompanying drawings, in which.

BEST MODE OF CARRYING OUT THE INVENTION

Figure 1:
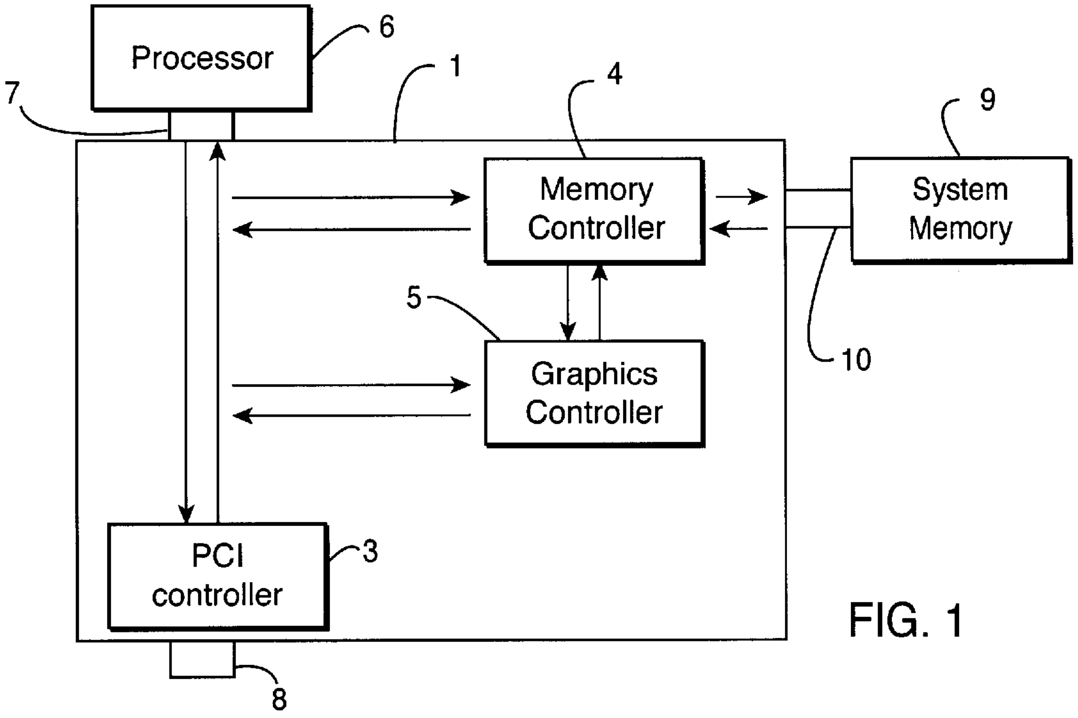
FIG. 1 is a schematic view of a UMA single-chip chipset of the prior art.
Figure 2:
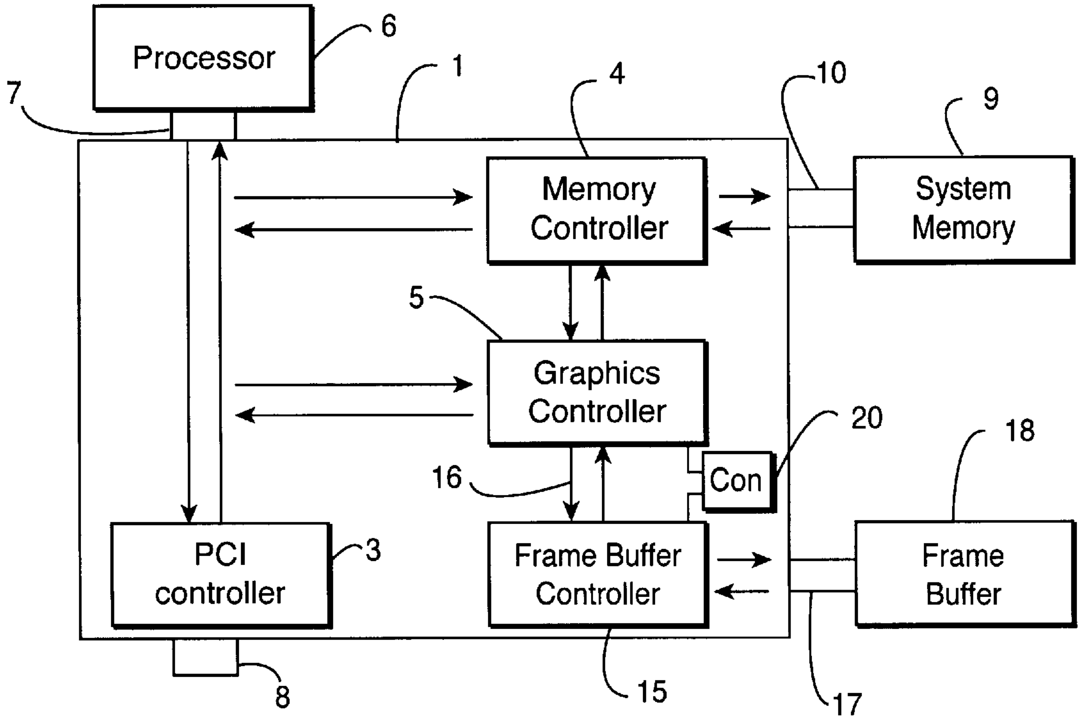
FIG. 2 is a schematic view of a single-chip chipset according to the invention.

FIG. 2 is a schematic view of a single-chip chipset according to the invention; the components of the chipset of FIG. 2 similar to those of FIG. 1 are referred to by the same numbers, and need not be described again.

The chipset of FIG. 2 further comprises a specific frame buffer controller 15 in the single chip 1; this controller 15 may be accessed by the graphics controller 5, as shown by arrow 16 in FIG. 1. Thus, the frame buffer controller 15 of the single chip 1 may be connected through a frame buffer bus 17 to an optional frame buffer 18.

The frame buffer bus 17 is preferably a narrow, high speed bus; such a bus has the advantage of limiting the number of pins of the single chip chipset 1, while allowing a fast access to the frame buffer 18. Such a bus and memory system is available under the tradename RAMBUS, and provides for instance a 8 bit access at a speed of up to 600 MHz, thus allowing frame buffer access with a bandwidth of 600 MB.

The single chip chipset/graphics controller of FIG. 2 may be used in a first configuration, without any optional frame buffer 18. In this case, the operation is similar to the prior art UMA operation described in reference to FIG. 1: the graphics controller 5 accesses the shared system memory 9 through the memory controller 4 and the system bus 10. In this configuration, the frame buffer controller 15 is not used. The single chip chipset/graphics controller of FIG. 2 may also be used in a second configuration, with the optional frame buffer 18. In this case, the graphics controller 5 accesses the frame buffer 18 through the frame buffer controller 15 and the frame buffer bus 17. The graphics controller need not share the system memory 9 with the processor, thus avoiding the memory sharing problems described above. The access of the graphics controller to the system memory may in this case be disabled (though it would also be possible to arrange for this access always to be available).

Thus, the single chip chipset/graphics controller of FIG. 2 provides both for a relatively inexpensive solution (the first configuration) and a high performance solution (the second configuration) that is more in line with the present trend of more and more colour depth and resolution.

Configuration control is effected by a control block 20 provided as part of the chipset 1. This control block 20 may simply be externally programmed at system startup to configure access between the graphics controller and the system memory 9 and/or the frame buffer memory 18 as required. Preferably, however, the control block 20 is provided with associated detection means for automatically detecting (for example, at boot time) whether or not a frame buffer memory 18 is connected. In this case, if the detection means indicates that the frame buffer memory 18 is absent, then the control means sets the first configuration referred to above, and the operation is a standard UMA operation. However, if the frame buffer 18 is present, the second high performance configuration is used. The person skilled in the art of integrated circuits may easily provide appropriate control and detection means.

This permits a personal computer manufacturer to cover a whole range of products without having to change the single chip; it also allows later upgrading of a computer by the user. The invention thus allows high versatility.

The present description of the preferred embodiment of the invention is exemplary only. Variations will be apparent to the person skilled in the art.

What is claimed is:

1. A single-chip chipset with integrated graphics controller for a computer, said chipset including:

a graphics controller;

first external-interface means for connecting to external system memory;

a memory controller connected to said first external-interface means and including means for interfacing the memory controller and graphics controller to allow the latter to access said system memory through said first external-interface means;

second external-interface means for connecting to an external frame buffer memory;

a frame-buffer controller connected to said second external-interface means and including means for interfacing the frame-buffer controller and graphics controller to allow the latter to access said external frame buffer through said second external-interface means; and control means for controlling the operative interconnection of the graphics controller at least with the external frame buffer memory through the frame-buffer controller.

2. A single-chip chipset according to claim 1, wherein the frame buffer controller and second external-interface means serve to provide a high-speed narrow access path to said external frame buffer.

3. A single-chip chipset according to claim 2, wherein said access path is eight bits wide and operates at a speed in excess of 600 megabytes/second.

4. A single-chip chipset according to claim 1, wherein said control means includes detection means for detecting whether an external frame buffer is connected to the second external-interface means.

5. A single-chip chipset according to claim 4, wherein the control means is responsive to the detection means indicating the presence of an external frame buffer memory, to permit access between the graphics controller and the framebuffer memory, and otherwise to inhibit such access; access from the graphics controller to the system memory being permitted independently of the whether the frame buffer memory is present.

6. A computer having a single-chip chipset with integrated graphics controller according to claim 5, said computer including means for receiving a frame buffer memory and means interconnecting said means for receiving to said second external-interface means of the single-chip chipset.

7. A single-chip chipset according to claim 1, wherein the control means is further operative to control connection of the graphics controller to the system memory through the memory controller.

8. A single-chip chipset according to claim wherein 7, said control means includes detection means for detecting whether an external frame buffer is connected to the second external-interface means.

9. A single-chip chipset according to claim 8, wherein the control means is responsive to the detection means to permit access between the graphics controller and one only of the system memory and frame buffer memory, the control means being responsive to the detection means indicating the presence of an external frame buffer memory, to permit access between the graphics controller and the frame-buffer memory, and otherwise to permit access between the graphics controller and system memory.

10. A computer having a single-chip chipset with integrated graphics controller according to claim 9, said computer including means for receiving a frame buffer memory and means interconnecting said means for receiving to said second external-interface means of the single-chip chipset.

11. A computer having a single-chip chipset with integrated graphics controller according to claim 1.

12. A process for allocating memory to a graphics controller integrated into a single-chip chipset according to claim 1, the process comprising the steps of:

allowing access of the graphics controller to the system memory, through the memory controller, and allowing access of the graphics controller to the frame buffer through the frame buffer controller when a frame buffer is connected to the second means.

13. A process according to claim 12, further comprising a step of detecting whether a frame buffer is connected to the second means.

14. A process according to claim 13, further comprising a step of disabling access of the graphics controller to the system memory when a frame buffer is connected to the second means.

15. A computer having system memory and a single-chip chipset with integrated graphics controller, said chipset including:

a graphics controller;

first interface means for connecting said chipset to system memory;

a memory controller connected to said first interface means and including means for interfacing the memory controller and graphics controller to allow the latter to access said system memory through said first interface means;

second interface means for connecting to an external frame buffer memory;

a frame-buffer controller connected to said second interface means and including means for interfacing the frame-buffer controller and graphics controller to allow the latter to access said external frame buffer through said second interface means, wherein the frame buffer controller and second interface means serve to provide a high-speed narrow access path to said external frame buffer, said access path being operable at a speed in excess of 600 megabytes/second; and control means for controlling the operative interconnection of the graphics controller at least with the external frame buffer memory through the frame-buffer controller, said control means including detection means for detecting whether an external frame buffer is connected to the second interface means, the control means being responsive to the detection means indicating the presence of an external frame buffer memory, to permit access between the graphics controller and the frame-buffer memory, and otherwise to inhibit such access; access from the graphics controller to the system memory being permitted independently of whether the frame buffer memory is present and said control means being further operative to control connection of the graphics controller to the system memory through the memory controller.

* * * * *